United States Patent [19]

Klose et al.

[11] 4,443,801

[45] Apr. 17, 1984

[54] DIRECTION FINDING AND FREQUENCY IDENTIFICATION METHOD AND APPARATUS

[75] Inventors: Dirk R. Klose, Eatontown; Skudera, Jr. William J., Oceanport, both of N.J.

[73] Assignee: The United States of America as represented by the Secretary of the Army, Washington, D.C.

[21] Appl. No.: 273,806

[22] Filed: Jun. 15, 1981

[51] Int. Cl.$^3$ .............................................. G01S 5/04
[52] U.S. Cl. .................................... 343/442; 343/378
[58] Field of Search ............... 343/113 R, 117 A, 119, 343/100 CL

[56] References Cited

U.S. PATENT DOCUMENTS 4,017,854  4/1977  Ross ................................. 343/113 R Primary Examiner—Theodore M. Blum
Attorney, Agent, or Firm—Robert P. Gibson; Jeremiah G. Murray; Michael Zelenka

[57] ABSTRACT

A surface acoustic wave interferometer direction finding and frequency identification method and apparatus is disclosed. The invention utilizes a plurality of dispersive delay lines in order to represent a multiplicity of signals, having different frequencies and angles of arrival at a plurality of antennae, by a train of pulses which retain phase information. Analysis of the interpulse spacing among the pulses in this pulse train, which represents the difference in frequency among the multiplicity of signals arriving at the antennae of the invention, and a pulse comparison of the signals at each of the antennas, allows selective correlation of signal with angle of arrival.

14 Claims, 4 Drawing Figures

DIRECTION FINDING AND FREQUENCY IDENTIFICATION METHOD AND APPARATUS

The invention described herein may be manufactured, used, and licensed by or for the Government for governmental purposes without the payment to me of any royalties thereon.

DISCUSSION OF PRIOR ART

Several direction finding and frequency source identification methods exist in the prior art. The most well known of these is probably what might be termed standard heterodyning techniques. This technique tunes a heterodyne receiver for peak output and provides a readout of the frequency in question. Direction finding may be accomplished through the use of a highly directional antenna. This technique is very time consuming and not possible in the instance when the signal source is hopping in frequency.

A second prior art technique might be categorized as the Bragg cell acousto-optic technique. In that technique a laser beam is reflected from the surface of a surface acoustic wave device carrying an acoustic representation of the signal of interest and the angle of reflection, called the Bragg angle, is measured. This angle of reflection varies as a function of frequency and hence can be used for frequency determination. The angle of arrival at the antennae of such a system is determined by measuring the time the signal arrives at each of the antenna. In order to make this measurement with any significant degree of resolution the antennae must be separated by a substantial distance, thereby precluding the use of an airborne measurement platform and otherwise limiting the effective application of this technique. In addition several measurements of a given signal are needed to accurately determine its frequency since an integration is performed over several cycles when this technique is used.

A third prior art technique may be termed the compressive receiver technique. In this type of receiver an input signal is mixed with a chirp signal and swept through the intermediate frequency band for a designated time interval. The signal's position in time is therefore indicative of its frequency. Angle of arrival in this technique is determined by an amplitude comparison technique not familiar to the applicant, or by accurately measuring the difference in time of arrival of the signal of interest at a plurality of antennas and suffers the same limitations as does the Bragg angle technique in that regard.

OBJECT OF THE INVENTION

An object of the invention is to provide an apparatus for use with, or in, an energy receiving system, which will enable that system to perform high resolution angle of arrival measurements on multiple signal intercepts of different frequency, whether or not those signals are received coincidentally.

A further object of the invention is to provide an apparatus of the type described above which will enable the use of an energy receiving system mounted on an airborne measurement platform and overcoming the limitations of the heterodyning techniques described above.

BRIEF SUMMARY OF THE INVENTION

The SAW Interferometer processor of the invention is based on two Chirp-Z transformer channels that utilize a common sweeping chirp local oscillator. Signals of interest are received, heterodyned, and then mixed with this common sweeping local oscillator. The mixed signals are coupled to the two chirp-Z transformer channels. The outputs of the two Chirp-Z transformer channels are fed to a phase comparator circuit that resolves the relative phase shift between the signals from each of the channels. The frequency of the input signals can be derived from the time ordering of the energy spikes, these spikes being the physical representation of the transform coefficients, present at the output of the Chirp-z channels prior to phase detection. The angle of arrival of a signal of given frequency is determined by sampling of the phase comparator outputs followed by a simple calculation performed by a microprocessor. Various alternative circuits are disclosed which provide for the elimination of any potential phase ambiguity, an increase detection bandwidth and the multiplexing of the surface acoustic wave devices utilized in the invention.

This technique has the advantage of offering various desirable attributes of different of the prior art systems never before available in ony one device or combination of devices. Electrical phase information retained in signals operated on by a Chirp Z transform, has heretofore not been utilized to determine angle of arrival of an incoming signal. The utilization of electrical phase information, as differentiated from time of arrival information, permits an intra antenna spacing of in the order of one half to two wavelengths. This relatively close antenna spacing allows the invention to be mounted on an airborne platform, a feature not available in the prior art without the use of a standard heterodyne receiver and directional antenna. The use of a standard heterodyne receiver and directional antenna, however, precludes detection and location with any certainty of a source hopping in frequency and, further, due to tuning time constraints, may not even permit any detection of a transmitted signal.

In addition, the use of a Chirp-Z local signal processing oscillator in combination with the Chirp-Z signal processing channels of the invention provide an operating bandwidth comparable to that of a compressive receiver of the prior art while still affording the advantage of relatively small antenna separation described above.

DETAILED DISCUSSION OF THE INVENTION

Figure 1:
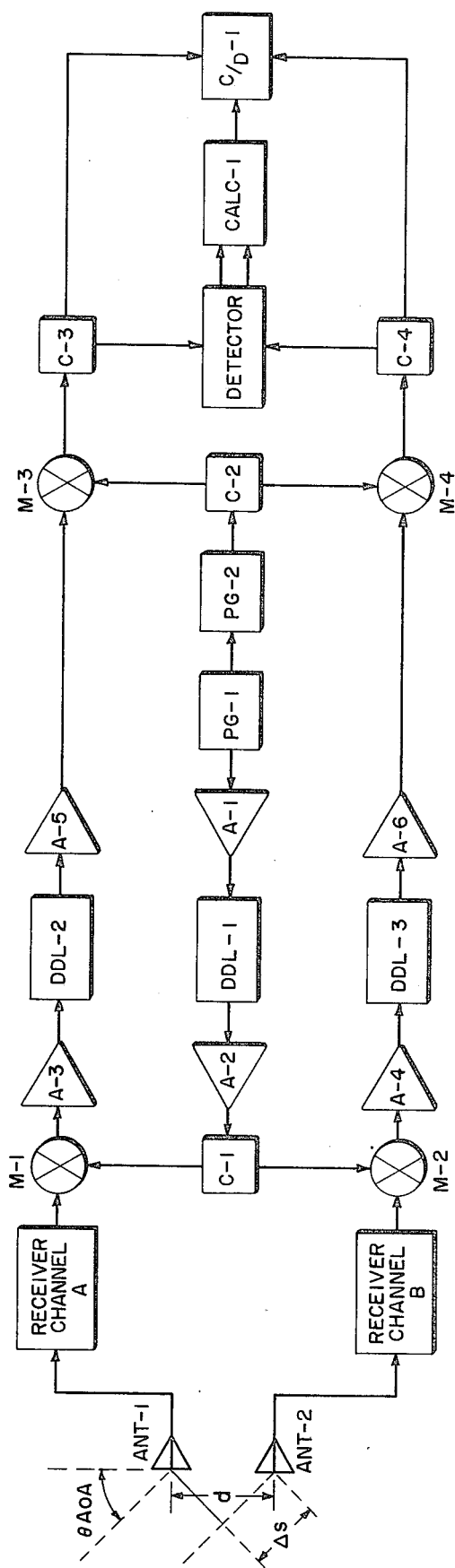
FIG. 1 is a basic block diagram representation of the apparatus and method of the invention.

FIG. 1 is a block diagram of a basic implementation of the invention. The operation of the invention might most easily be explained by tracing a typical input signal through this figure while furnishing a description of the function of the various elements of the block diagram as both the input signal path and the internally generated signal path are traced through the circuit of the invention.

The first internally generated signal, S1, is produced by the first pulse generator, P.G.1, and is appropriately amplified in the first amplifier, A1. Signal S1, is an impulse signal having a power of approximately 1 milliwatt typically after amplification in A1. The output of amplifier A1 is introduced into a surface acoustic wave dispersive delay line, DDL-1. A surface acoustic wave dispersive delay line has the property of expanding an impulse signal into a linear frequency modulated sweeping signal. The surface acoustic wave dispersive delay line of the preferred embodiment produced an output signal of 10 Mhz in bandwidth centered at 70 Mhz and having a total duration of 7 μs. Surface acoustic wave dispersive delay lines also have the property of attenuating the input signal in the order of 40 dbs (although some lines having an attenuation in the order of 25 dbs are available) and, accordingly, amplifier A2 is introduced at the output of DDL-1 to enhance the amplitude of the 7 μs signal S2, prior to its introduction into the first coupler, C1. The input signal to coupler C1, signal S2, is evenly divided in coupler C1 and the resultant signals S3 and S4 are each introduced into identical mixers, designated M1 and M2 respectively.

Here they will be mixed with the input signals from channels A and B respectively of a dual channel receiver. This receiver may be any of several types well known in the prior art capable of reducing a received radio frequency signal to an intermediate frequency, in the order of 140 Mhz for the embodiment tested. This frequency reduction may be accomplished by the usual heterodyning techniques so long as the phase relationship among the received signals is maintained. The received signals are a plurality of signals, each having its own frequency, which are received essentially simultaneously at the two antennae, A1 and A2, of the receiver. For purposes of simplification let us assume there are two such received signals, the nature of each of which is pulsed R.F. Let us further assume that the first input signal, I1, after processing in channel A or B of the receiver, is represented by an I.F. signal of 140 Mhz and the second input signal, I2, after processing in channel A or B of the receiver, is represented by an IF signal of 135 Mhz. It is to be understood that both signal I1 and I2 are received simultaneously at each of the antennae A1 and A2 of FIG. 1, however due to the fact that antennae A1 and A2 are separated by a distance of approximately ½ to 2 wavelengths, there will be a phase difference between signal I1 as it appears at antenna A1 and signal I1 as it appears at antenna A2. A similar condition exists for signal I2.

The IF representations of signals I1 and I2 as received at antenna A1 are introduced into mixer M1. As indicated earlier it has been assumed these signals are centered at 140 and 135 Mhz, respectively. When these signals are mixed with signal S3 the difference frequencies will be centered at 70 and 65 Mhz respectively. Considering then, the signals at the output of mixer M1, it is understood that in the example proposed these signals are 10 Mhz in bandwidth, are coincident in time, and are centered around 70 and 65 Mhz. These difference signals are amplified in amplifier A3 in order to restore them to sufficient amplitude to be processed by the second surface acoustic wave dispersive delay line, DDL-2. When a signal having the characteristics of that produced after amplifier A3 is introduced into a surface acoustic wave dispersive delay line having the proper slope the resultant output signal is a pair of very narrow pulses, the width of which are inversely proportional to the bandwidth of the dispersive delay line, separated in the time domain by a readily calculable amount, one of which is representative of the signal centered around 65 Mhz and the other of which is representative of the signal centered around 70 Mhz. It should be emphasized that the output signal from the second surface acoustic wave dispersive delay line, DDL-2, is a pair of R.F. pulses of different nominal center frequency separated in the time domain, as distinguished from the input signal into DDL-2 which comprised two spread spectrum signals, overlapping in frequency, but coincident in time. This type of signal transformation is called a chirp transform. This type of transform is well known in the prior art, see for example the paper "Surface Wave Transform Adaptable Processor System", I.E.E.E. Catalog No. 75 CHO 994-4SU. The output pulse time ordering is linearly related, in reverse order, to the frequency of the input component signals. Let us call the output pulses from DDL-2 P1 and P2 where P1 is the representation of the portion of the input signal centered at 65 Mhz and P2 is representative of the portion of the input signal centered at 70 Mhz. These signals are amplified by amplifier A5 to restore them after attenuation in DDL-2. Explanation of the remainder of FIG. 1 will be easier if we consider mixer M1, amplifier A3, delay line DDL-2, amplifier A5, and mixer M3 as comprising a first channel of the invention; and mixer M2, amplifier A4, delay line DDL-3, amplifier A6 and mixer M4 as comprising a second, identical channel.

The IF representation of signals I1 and I2 received at antenna A2 are processed in this second channel in the same manner the IF representation of signals I1 and I2 received at antenna A1 are processed in the first channel. Therefore, the signals at the outputs of amplifiers A5 and A6 are identical but are shifted in phase by an amount consistent with the separation of the antennas A1 and A2 and the positions of the signal sources. These identical output signals from amplifiers A5 and A6 are then introduced at mixers M3 and M4 respectively. Mixers M3 and M4 are identical and each produces an output only when signals are present at both of that device's input terminals. One input terminal of mixer M3 is connected to amplifier A5 and one input terminal of mixer M4 is connected to amplifier A6. The second input terminal in both of the mixers M3 and M4 is connected, through coupler C2, to the output of a second pulse generator, P.G. 2, which contains a variable time delay and which is triggered by the first pulse generator, P.G. 1. Since the expected time of arrival of either of the R.F. pulses from amplifier A5 is easily determined, and since that time corresponds to the time of arrival of the corresponding R.F. pulse at mixer M4, the time delay in the second pulse generator, PG2, may be set so as to introduce signals at one input terminal of mixers M4 and M3 at a time so as to correspond to the arrival of the selected R.F. pulses from amplifier A5 and A6 at the other input terminal of those mixers. Accordingly, the outputs of mixers M3 and M4 will consist only of signals representative of the selected R.F. pulses representing the received frequency of interest. If the user of the invention is uncertain as to what frequencies are of interest, or if for any reason a user desires to monitor a range of frequencies, this may be easily accomplished by utilizing pulse generator P.G.2 to generate a train of pulses to be introduced at mixers M3 and M4. The interpulse spacing in this pulse train represents the closeness in the frequency spectrum of the frequencies to be examined since the chirp transform separates the various input signals of different frequency in the time domain. The length of the pulse train determines the width of the passband to be examined. Of course the passband is also limited by the bandwith of the dispersive delay lines, DDL-2 and DDL-3. The output pulses from mixer M3 are then introduced at the third coupler, C3 and the output pulses from mixer M4 are introduced at C4. These couplers are identical, and divide the signals which are introduced into them equally, routing one portion of each of the signals to a first detector, DET 1. This detector is of the well known type having two outputs wherein one output is called Ex or R and the second is called Ey or I such that the arctangent of ($\Delta Ey/\Delta Ex$) is equal to the difference in electrical phase of the signals introduced in the detector, $\theta el$. In the invention of this application that electrical phase difference corresponds to the difference in phase of the input signal between antenna A1 and antenna A2. Knowing this difference in phase the angle of arrival is easily calculated from the expression $$\theta_{AOA} = \cos^{-1}\left[\frac{\tau \times \theta_{el}}{\alpha \times 360}\right]$$

This calculation may be accomplished by table look-up or through the use of a microprocessor or similar apparatus, identified generically in the drawings as calculator CALC-1. The output of calculator CALC-1, and that output from coupler C3 not utilized for phase discrimination purposes are electrically connected to a correlator and display means, also synchronized with pulse generator for correlating the calculator outputs of angle of arrival with signal frequency and displaying this information. This correlation and display may be accomplished by well known methods and serves only as a means for utilizing the information obtained by the circuitry of the invention as already described. By placing several receivers utilizing the invention in positions such that triangulation could be performed, correlations could be made over successive time periods to determine if a transmitter in a given location was switching the frequency of the carrier.

Figure 2:
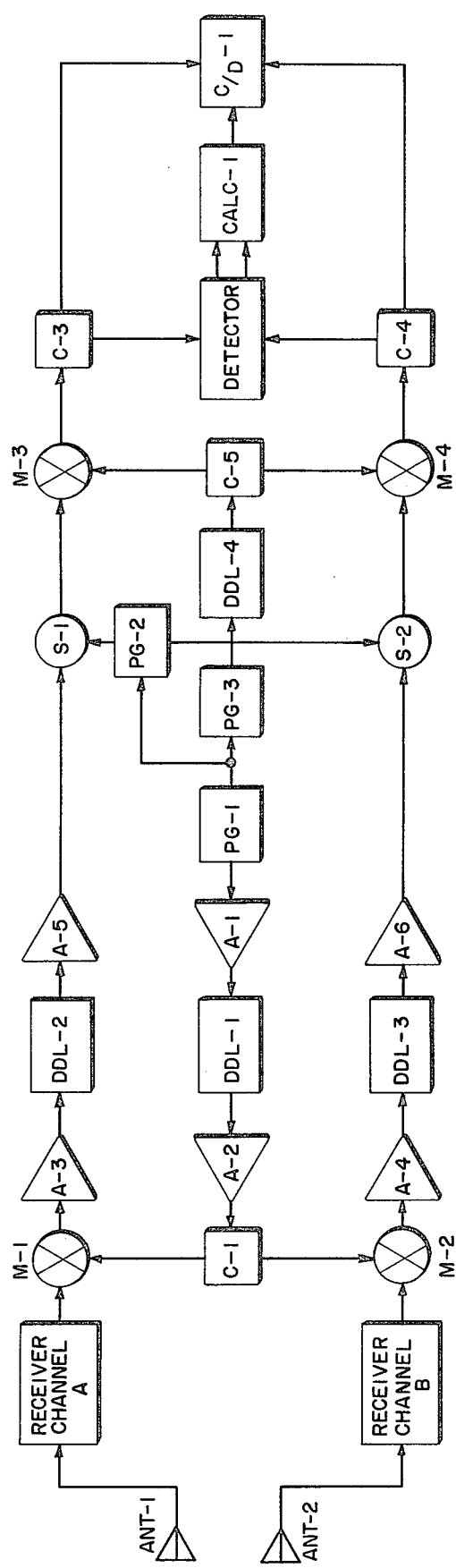
FIGS. 2 and 3 are block diagram representations of the apparatus and method of the invention which provide for the use of a detector of narrower bandwidth than the range of signals expected to be encountered.

The configuration of the invention shown in FIG. 1 suggests several alternate constructions which offer specific advantages which are useful in certain situatons. In the case where the circuit of FIG. 1 is to be operated over bandwidths that are greater than the operating range of detector DET 1, the circuit of FIG. 2 may be utilized. That portions of the circuit shown in FIG. 2 to the left of the dashed line is identical in construction and operation as that set out in FIG. 1. The right side of the dashed line differs in that a third pulse generator, PG 3, provides an impulse to a fourth surface acoustic wave dispersive delay line, DDL-4, which causes a spread spectrum signal to appear at mixers M3 and M4. This spread spectrum signal is timed such that it appears at mixers M3 and M4 coincident with the signals from Gate 1 and Gate 2 respectively. These gates permit a selected portion of the signal from amplifier A5 and A6 to reach mixer M3 and M4 respectively. That portion of the signal from amplifiers A5 and A6 which is permitted to reach mixers M3 and M4 is selected by adjusting the timing of the output pulse from the second pulse generator, PG2, in the names described above in relation to FIG. 1. The signals appearing at mixers M3 and M4 from gates 1 and 2 are mixed down with the signal from the fourth surface acoustic waves dispersive delay line DDL-4 coupled through coupler C5. The mixed signals then are of a frequency suitable for detection in the detector, DET 1. More specifically, if the outputs after amplifiers A5 and A6 were plus chirp Z outputs, that is, as the input frequency increases the signals appearing after amplifier A5 and A6 are delayed longer in time, then by using a dispersive delay line DDL-4 with an up chirp spectrum, one were frequency increases with time, the mixed outputs from mixers M3 and M4 would always have approximately the same center frequency. Calculalations, correlations, and display may be performed in the manner set out above relative to FIG. 1.

Figure 3:
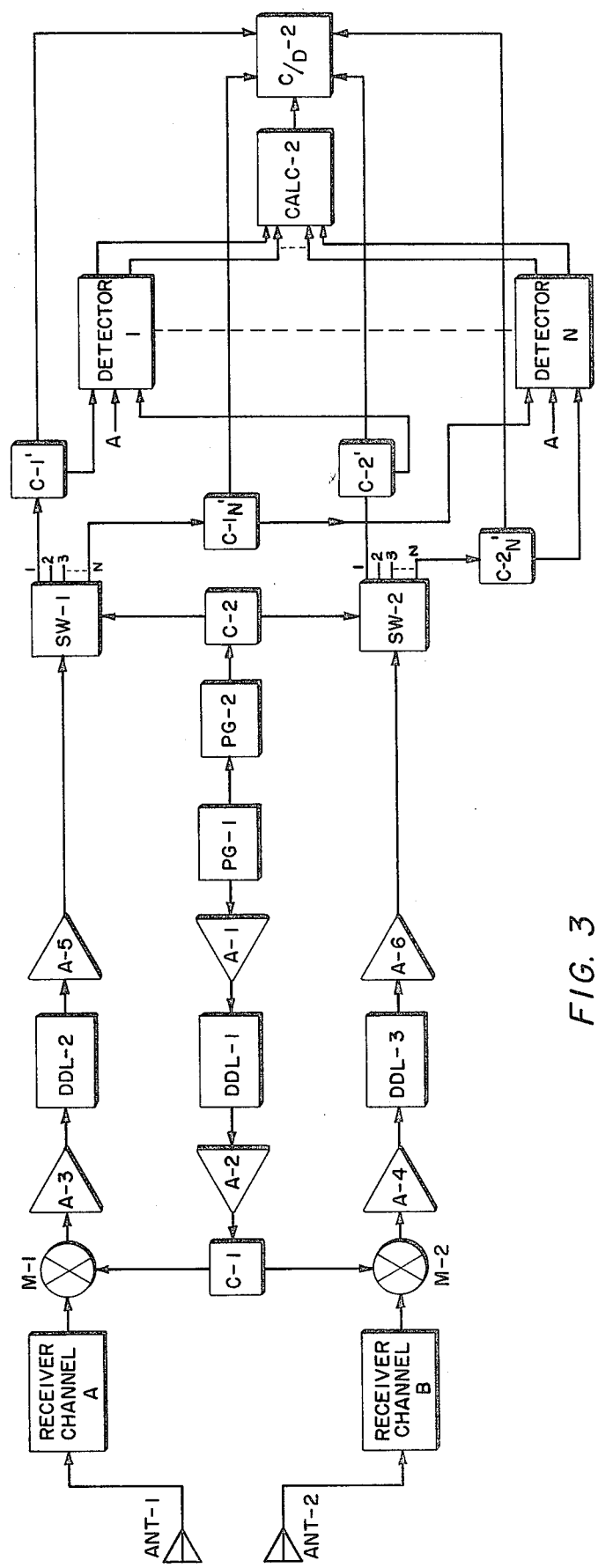

A second alternative for operating the invention over bandwiths greater than those acceptable by an individual detector is shown in FIG. 3. As in FIG. 2, everything to the left of the dotted line is identical to that set out in FIG. 1. This alternative differs from those already discussed in that a plurality of detectors, DET 1 through DET 2, are utilized each detector being capable of detection in a different portion of the frequency range of interest. As may be seen from the figure, the fourth dispersive delay line, DDL-4, mixers M3 and M4 and gate 1 and 2 are omitted from the circuitry. Two complex switches SW1 and SW2 are used to direct the desired pulse of those processed to the suitable detector. This could be accomplished by utilizing pulse generator PG2, when triggered by pulse generator PG1, to emit a burst of distinct pulses causing complex switches SW1 and SW2 to effectively time gate, and thereby frequency gate, the signals outputed from amplifiers A5 and A7 and correctly forward each such signal to a suitable detector. Again, calculations, correlations, and display may be performed in the manner set out above relative to FIG. 1.

Figure 4:
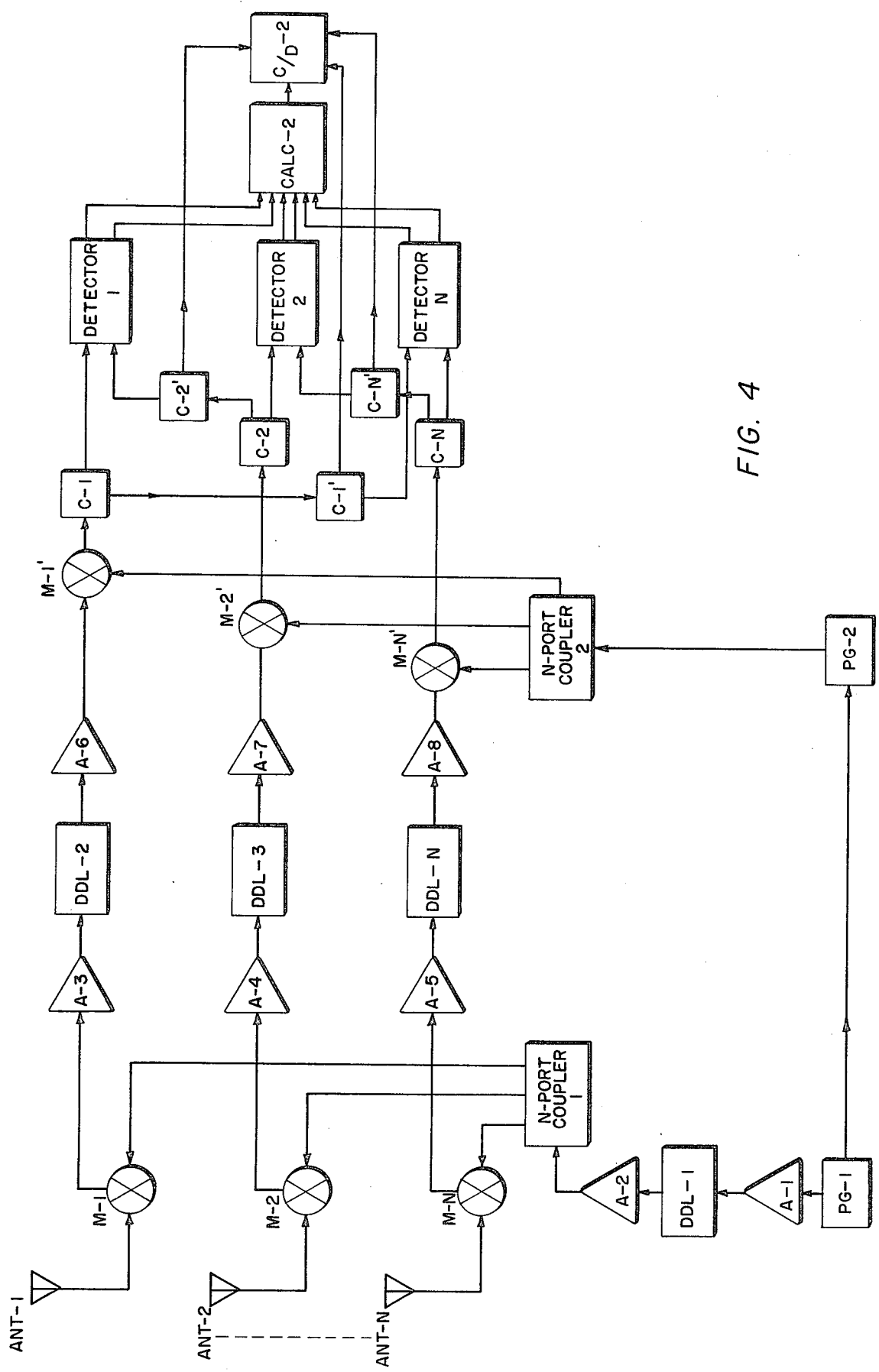
FIG. 4 is a block diagram representation of the apparatus and method of the invention which provides for the elimination of phase ambiguity.

To avoid phase ambiguities, that is, erroneous phase information stemming from signals arriving at antennae A1 and A2 of FIG. 1 having greater than $\pm 180°$ difference in phase, the N channel configuration of FIG. 4 may be utilized. This configuration operates in the same manner as that of FIG. 1 except that three or more antennae are used to avoid confusion as to phase. Since phase information is gathered relative to the time of arrival of the signal at more than one other antenna phase ambiguities are eliminated.

In addition to those embodiments illustrated by the figures, several other means of utilizing applicant's invention will be obvious to one skilled in the art and this disclosure is not intended to exclude those means from the scope of applicant's invention.

What is claimed is:

1. A method for determining the frequency and angle of a plurality of radio frequency signals of differing transmission frequency arriving essentially simultaneously at each of N spatially separated antennae of a radio frequency receiver, where $N \geq 2$, comprising:

a first processing step wherein the received radio frequency signals arriving at each antenna are processed in such a manner as to obtain N composite signals, each representative of the plurality of radio frequency signals arriving at one of the antennae, all retaining the phase relationship of those radio frequency signals resulting from the spatial separation of the antennae, each having a frequency component representative of each of those radio frequency signals arriving at the antenna with which it is associated, and each being of suitable amplitude and frequency for further processing in a dispersive delay line;

introducing all of the N composite signals into dispersive delay lines, while retaining the phase relationship among those signals, so as to separate, in the time domain, components of each composite signal differing in frequency while retaining the phase relationship of those components representative of the spatial separation of the antennae;

a second processing step wherein the components of each of the composite signals are processed so as to determine the frequency of the radio frequency signal which they represent based on the position of each of the components in the time domain after their separation in the dispersive delay line while retaining the phase relationship of those components representative of the spatial separation of the antennae;

detecting the electrical phase relationship among components of the same frequency of different of the composite signals thereby determining electrical phase information about those signals;

converting the electrical phase information to angle of arrival information;

correlating the angle of arrival information for each component of each composite signal with the frequency information relative to that component; and outputing the correlated information.

2. The method of claim 1 wherein said first processing step includes heterodyning the radio frequency signals to obtain intermediate frequency signals and further includes mixing these intermediate frequency signals with a frequency modulated sweeping signal.

3. The metod of claim 2 wherein said first processing step still further includes amplifying the mixed intermediate frequency signals prior to their introduction into the dispersive delay lines.

4. The method of claim 3 wherein said second processing step includes time gating the components of the composite signals so as to enable determination of the frequency of the radio frequency signals they represent.

5. The method of claim 3 wherein said second processing step further includes reducing the frequency of the components of the composite signal prior to their detection so as to enable the use of detectors operating in a lower frequency band.

6. A method for determining the frequency and angle of arrival of a plurality of radio frequency signals of differing transmission frequency arriving simultaneously at each of a pair of spatially separated antennae of a radio frequency receiver comprising:

processing the received signals arriving at each of the antennae so as to obtain two composite intermediate frequency signals, the first representative of the plurality of radio frequency signals arriving at one of the antennae and the second representative of the plurality of radio frequency signals arriving at the other antenna and both retaining the phase relationship of those radio frequency signals resulting from the spatial separation of the antennae and a frequency component representative of each of those radio frequency signals;

separately mixing and maintaining in individual channels the intermediate frequency signals representing the signals received at each antennae with a frequency modulated sweeping signal so as to further reduce the frequency and provide a plurality of frequency modulated sweeping signals representative of the plurality of the received signals at each antenna while retaining the phase relationship of the representative signals;

equally amplifying the resultant plurality of signals present in each channel while maintaining the phase relationship between them;

introducing the plurality signals in each channel into a dispersive delay line so as to separate signals of different frequency in the time domain so as to form a series of pulses in each channel while retaining the phase relationship between the corresponding signals in each channel;

amplifying the resultant signals to restore them for further processing while maintaining the phase relationship between the corresponding signals in each channel;

time gating and mixing the series of pulses in each channel so as to determine the transmission frequency each pulse represents and prepare the corresponding pulses in each channel for electrical phase detection;

detecting the electrical phase relationship of each pair of corresponding pulses in each channel;

computing the angle of arrival of the radio frequency signals at the antennae of the radio frequency receiver by utilizing the electrical phase relationship of each pair of radio frequency signals and the spatial separation of the antennae; and correlating and displaying the angle of arrival and frequency of the received signals.

7. The method of claim 6 wherein phase ambiguities are eliminated by comparing the relative electrical phases of corresponding radio frequency signals as they are received at three or more antennae.

8. An apparatus for determining the frequency and angle of arrival of a plurality of radio frequency signals of differing transmission frequency arriving essentially simultaneously at each of N spatially separated antennae of a radio frequency receiver where N 2 comprising a first processing means wherein the received radio frequency signals arriving at each antenna are processed in such a manner as to obtain N composite signals, each representative of the plurality of radio frequency signals arriving at one of the antennae, all retaining the phase relationship of those radio frequency signals resulting from the spatial separation of the antennae, each having a frequency component representative of each of those radio frequency signals arriving at the antenna with which it is associated, and each being of suitable amplitude and frequency for further processing in a dispersive delay line;

dispersive delay means, electrically connected to said first processing means and operating so as to separate, in the time domain, components of each composite signal differing in frequency while retaining the phase relationship of those components representative of the spatial separation of the antennae;

a second processing means electrically coupled to said dispersive delay means, wherein the components of each of the composite signals are processed so as to determine the frequency of the radio frequency signal which they represent based on the position of each of the components in the time domain after their separation in the dispersive delay line while retaining the phase relationship of those components representative of the spatial separation of the antennae;

phase detection means, electrically coupled to said second processing means, for detecting the electrical phase relationship among components of like frequency of different of the composite signals thereby determining electrical phase information about those signals;

conversion means, electrically coupled to said phase detection means, for converting the electrical phases information to angle of arrival information;

correlating means, electrically coupled to said conversion means, for correlating the angle of arrival information for each component of each composite signal with the frequency information relative to that component; and output means, electrically coupled to said correlating means for outputing the correlated information.

9. The apparatus of claim 8 wherein said first processing means includes means for heterodyning the radio frequency signals to obtain intermediate frequency signals and further includes means for mixing these intermediate frequency signals with a frequency modulated sweeping signal.

10. The apparatus of claim 9 wherein said first processing means still further includes means for amplifying the mixed intermediate frequency signals prior to their introduction into the dispersive delay lines.

11. The apparatus of claim 10 wherein said second processing means includes means for time gating the components of the composite signals so as to enable determination of the frequency of the radio frequency signals they represent.

12. The apparatus of claim 11 wherein said second processing means further includes means for reducing the frequency of the components of the composite signal prior to their detection so as to enable the use of detectors operating in a lower frequency band.

13. In an R.F. signal receiving system of the type having two antennas and a first and second independent processing channel each associated with one of the antennas, said processing channels having as their function as a minimum the detection of the R.F. signal received and the reduction of the range of frequency of the R.F. signal received to an intermediate frequency range while preserving the relative phase information of the signals received at each of said antennae, an improvement permitting the determination of both angle of arrival of one or a plurality of R.F. signals received at the antennae of the system and the transmission frequency of each of those R.F. signals comprising:

a first local oscillator means having an output terminal and producing a frequency modulated sweeping local oscillator signal at said output terminal;

a first coupling means having a first and second output terminal and an input terminal, electrically connected to the first local oscillator means for dividing the frequency modulated sweeping local oscillator signal into first and second substantially identical signals;

a first mixing means having a first and second input terminal and an output terminal and electrically connected at the first input terminal to the first output terminal of said first coupling means and electrically coupled at the second input terminal to the first processing channel of said receiving system, for mixing the first of the two substantially identical divided, frequency modulated, sweeping local oscillator signals with the intermediate frequency signal from the first processing channel of said receiving system;

a second mixing means having a first and second input terminal and an output terminal and electrically connected at the first input terminal to the second output terminal of said first coupling means and electrically coupled at the second input terminal to the second processing channel of said receiving system, for mixing the second of the two substantially identical divided, frequency modulated, sweeping local oscillator signals with the intermediate frequency signal from the second processing channel of said receiving system;

a first dispersive delay line having an input and output terminal, the input terminal of which is electrically connected to the output terminal of said first mixer means, for separating in the time domain, at its output terminal, signals of differing frequency introduced simultaneously at its input terminal;

a second dispersive delay line having an input and output terminal, the input terminal of which is electrically connected to the output terminal of said second mixer means, for separating in the time domain, at its output terminal, signal of differing frequency introduced simultaneously at its input terminal;

a second local oscillator means having an input and output terminal, electrically coupled to said first local oscillator means for signal synchronization purposes, having as its output a series of pulses for gating the outputs of said first and second dispersive delay lines;

a second coupler means, having one input and a first and second output terminal and having its input terminal electrically connected to the output of said second local oscillator means, for equally dividing the output signal from said second local oscillator means;

a third mixer means for mixing down and gating the signal from said first dispersive delay line, having a first and second input terminal and an output terminal, the first input terminal of which is electrically connected to the output terminal of said first dispersive delay line and the second input terminal of which is electrically connected to the first output terminal of said second coupler means;

a fourth mixing means for mixing down and gating the signal from said second dispersive delay line, having a first and second input terminal and an output terminal, the first input terminal of which is electrically connected to the output terminal of said second dispersive delay line and the second input terminal of which is electrically connected to the second output terminal of said second coupler means;

a third coupler means having one input and first and second output terminals for dividing the signal from said third mixer means and wherein said input terminal is electrically connected to the output terminal of said third mixer means;

a fourth coupler means having one input and first and second output terminals for dividing the signal from said fourth mixer means and wherein said input terminal is electrically connected to the output terminal of said fourth mixer and said second output is not utilized;

an electrical phase detector means for resolving into a first and second component the electrical phase difference of its input signals having first and second input terminals wherein said first input terminal is electrically connected to said first output terminal of said third coupler means and said second input terminal is electrically connected to said first output of said fourth coupler means, and further having first and second output terminals said first output terminal having a signal on it representative of the first component of the electrical phase difference of the signals from said third and fourth coupler means and said second output terminal having a signal on it representative of the second component of the electrical phase difference of the signals from said third and fourth coupler means;

calculator means, having a first and second input terminal and an output terminal, said first input terminal being electrically connected to the first output terminal of said electrical phase detector means and said second input terminal being electrically connected to said second output terminal of said electrical phase detector means, for calculating the angle of arrival of the received R.F. signal; and a correlator and display means, having three input terminals and one output terminal, the first input terminal being electrically connected to the output terminal of said calculator means, the second input terminal being electrically connected to the second output terminal of said third coupler means, and the third input terminal being electrically responsive to said first local oscillator means for timing purposes, and providing a display of the correlation of angle of arrival and signal frequency at its output terminal.

14. The invention of claim 13 wherein amplifier means are introduced in series between the first mixing means and the first dispersive delay line, between the first dispersive delay line and the third mixing means, between the second mixing means and the second dispersive delay line and between the second dispersive delay line and the fourth mixing means in order to restore the signal for further processing.

* * * * *